United States Patent
Cummings

[19]

[11] Patent Number: 6,057,788
[45] Date of Patent: *May 2, 2000

[54] REMOTE CONTROL KEYPAD UNIT

[76] Inventor: Thomas F. Cummings, 34 Marine Ave., Westport, Conn. 06880

[*] Notice: This patent is subject to a terminal disclaimer.

[21] Appl. No.: 09/083,068

[22] Filed: May 21, 1998

Related U.S. Application Data

[63] Continuation-in-part of application No. 08/884,741, Jun. 30, 1997, Pat. No. 5,764,180.

[51] Int. Cl.[7] .................................................. H03M 11/00
[52] U.S. Cl. ...................... 341/22; 341/176; 340/825.69; 340/20; 345/168
[58] Field of Search ............................... 341/176; 340/22, 340/20, 21, 825.72, 825.69; 345/169

[56] References Cited

U.S. PATENT DOCUMENTS

| | | | |
|---|---|---|---|
| 3,906,369 | 9/1975 | Pitman et al. | 325/111 |
| 4,442,506 | 4/1984 | Endfield | 364/900 |
| 4,655,621 | 4/1987 | Holden | 400/100 |
| 4,745,397 | 5/1988 | Lagerbauer et al. | 340/365 |
| 4,791,408 | 12/1988 | Heusinkveld | 340/365 |
| 4,878,055 | 10/1989 | Kasahara | 341/23 |
| 5,235,328 | 8/1993 | Kurita | 340/825.72 |
| 5,253,068 | 10/1993 | Crook et al. | 358/194.1 |
| 5,367,316 | 11/1994 | Ikezaki | 345/158 |
| 5,408,275 | 4/1995 | Song et al. | 348/734 |
| 5,426,449 | 6/1995 | Danziger | 345/168 |
| 5,432,510 | 7/1995 | Mathews | 341/20 |
| 5,436,625 | 7/1995 | Kubo | 341/22 |
| 5,450,079 | 9/1995 | Dunaway | 341/23 |
| 5,457,448 | 10/1995 | Totsuka et al. | 340/825.72 |
| 5,479,163 | 12/1995 | Samulewicz | 341/22 |
| 5,551,693 | 9/1996 | Goto et al. | 463/37 |
| 5,604,493 | 2/1997 | Behlke . | |

Primary Examiner—Michael Horabik
Assistant Examiner—Albert K. Wong
Attorney, Agent, or Firm—Sofer & Haroun, LLP

[57] ABSTRACT

A remote control device for operating an electronic device having an means. The remote control device is configured to be grasped for operation by both hands of a user and is comprised of a body having a lower part an upper part and a continuous sidewall extending between said lower and upper parts. One or more operation areas are positioned on the body and are equipped with a plurality of channel operation buttons, the channel operation buttons being arranged on the body and numbered to correspond with a user's fingers such that when the remote control is grasped in both of the user's hands, each of the user's fingers are comfortably positioned upon one of the plurality of operation buttons so as to facilitate control of the electronic device such that selection may be rapidly and conveniently changed by depressing the desired button with the finger which rests upon the operation button which corresponds to the desired selection. Additional basic control buttons, such as volume control, are easily reached by the user's fingers while grasping the body or bodies. The remote control device also includes channel operation means capable of generating a code signal which corresponds to one or more of the channel operation buttons when one or more of the channel operation buttons are depressed. An infrared beam emitter or wired connection is also provided for producing a signal beam to engage the infrared beam receiver of the television set to change a channel.

13 Claims, 6 Drawing Sheets

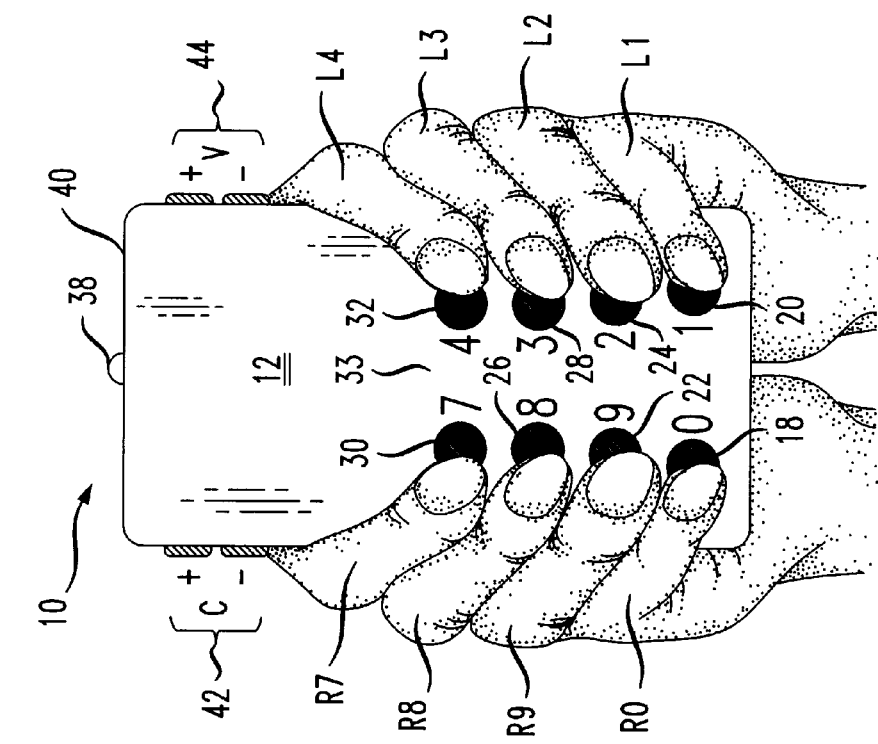

REMOTE CONTROL KEYPAD UNIT

CROSS-REFERENCE TO RELATED APPLICATIONS

This application is a continuation-in-part of application Ser. No. 08/884,741 which was filed on Jun. 30, 1997, now U.S. Pat. No. 5,764,180.

FIELD OF THE INVENTION

This invention relates to digital keypad controllers used for operating electronic devices and appliances, and in particular, to remote control keypad devices having tactile elements which facilitate the location of different keys on the keypad by the operator.

BACKGROUND OF THE INVENTION

The prior art is replete with numerous different types of remote control keypads for controlling electronic devices. Remote control digital keypads are commonly used to control numerous different types of electronic devices, such as television sets, stereos, video cassette recorders or CD recorders, computers, video games, as well as many different household electrical appliances. These control keypads are configured in a variety of shapes and sizes for ease of use by an operator in the home. Most control keypads include a plurality of raised "buttons" which are marked with numeric, alphanumeric, and/or other symbolic indicia for entering channel or station numbers, or for initiating or controlling a certain task.

Prior art remote control keypads come in a variety of shapes and sizes for use by one or two hands. Single hand remote control keypads include such devices as those disclosed in U.S. Pat. No. 5,432,510 and U.S. Pat. No. 4,791,408 which disclose remote control input keypads for single hand operation. These devices are ergonomically designed to fit in one hand for facilitating multiple key character input. These devices, however, are provided with only a small number of keys, each of which control numerous letters and numbers. As such, the user must memorize numerous button configurations and sequences in order to type the desired letter or number.

Other prior art remote control keypad units require the use of both hands, such as U.S. Pat. No. 4,878,055 and U.S. Pat. No. 4,745,397. These prior art devices are designed to be held in one hand while the second hand is used to depress one or more the numerous input control buttons or operation keys positioned on the unit's keypad. As these devices require the use of both hands, use in the dark is often difficult. Additionally, if the user is using the remote control keypad unit for controlling a television and desires to change the channel, the user must divert his or her attention from the program being watched in order to view the numerical keypad, locate the desired button, and input the new desired channel.

In U.S. Pat. No. 5,426,449 there is disclosed a pyramid shaped ergonomic keyboard for use with a personal computer. This device requires the placement of both hands upon the keyboard for the input of letters and numbers. This device, however, is designed exclusively for computer use and comprises a detailed layout of various letters and numbers with which the user must familiarize his or herself.

U.S. Pat. No. 5,253,068 teaches a remote control unit for controlling a television and which is shaped like a pistol or handgun such that a television viewer holds the remote control unit like a gun and changes the channels on the television by pointing the gun-shaped remote control at the television and pulling the trigger to "shoot" the channel to change the program by directing an infrared light beam to a receiver on the television or on a VCR. The handgrip portion of the gun-shaped remote control is provided with switches and buttons for entering the channel numbers, raising and lowering the volume and turning on and off the television or VCR, in addition to a variety of other switches and buttons which control specialized features. Also, this remote control may not comfortably fit in the hands of all users. Additionally, many people have strong feelings against the use of guns and some households may thus desire not to use gun-shaped objects within their homes.

U.S. Pat. No. 5,408,275 directed to an apparatus and method for controlling a television receiver teaches a remote control which comprises a keyboard for entering channels, and a rotary encoder which controls the volume and on-screen displays. This remote control, however, requires precision in using the rotary encoder in order to obtain the desired volume, and in addition, requires the user to scroll through numerous on-screen displays which interrupts the user's viewing of the television program being watched.

In U.S. Pat. No. 5,436,625 there is disclosed a folding electronic device in the form of a folding remote controller for a television set. The remote controller comprises a folding case consisting of a first case and a second case connected to one another by a pivotal hinge. Both the first and second case are provided with a plurality of input means and control buttons thereon for changing channels, controlling volume, color, contrast, etc. The hinge connection allows the first and second case to be folded upon one another to provide a compact unit when not in use. However, because of the compactness of this device when the first and second case are folded together, there is a likelihood that the device may be easily lost or displaced. Additionally, the hinged connection of the first and second case provides a potential for easy breakage or separation thus rendering the remote control inoperable.

U.S. Pat. No. 3,906,369 discloses a function switch arrangement for a hand-held remote control unit. The remote control unit comprises a housing having a pair of spaced parallel handgrips. Located forwardly of the handgrips and extending between them is a console having a function switch mounting surface with a V-shaped horizontal profile. An array of thumb actuated function switches is located on the console and arranged in upper and lower rows for easy access and control by the operator's thumbs. A pair of trigger switches, which effectuate proportional control by the functions initiated by the aforementioned thumb function switches, are mounted on the underside of the handgrips within range of operator's forefinger. A safety disabling switch is located beneath the function switch rows and extends transversely between the handgrip frame members so that it may also be activated by either of the operator's thumbs without disturbing the operator's grip on the unit. This device is large and bulky and is not directed for use in controlling television sets and electrical household appliances, but rather is designed for operating radio controlled airplanes and boats.

U.S. Pat. No. 4,655,621 teaches a combinatorial keyboard which encodes characters and spaces. This reference teaches a keyboard for a typewriter or computer which comprises two groups of keys for operation by the fingers of two hands of an operator. Each group of keys comprises five home keys arranged in a first single continuous row for each hand, and means for decoding operation of the keys to provide signals representative of characters. This device, however, requires a variety of functions by each finger and is directed to producing letters and/or numbers upon a piece of paper or upon a computer monitor screen; it is not adapted for use as a remote control for changing channels on a television set.

U.S. Pat. No. 5,479,163 discloses a digital keypad for controlling electrical devices and which includes tactile keys circularly arranged on the controller in a clock face pattern and including a handle portion which is detachably connected perpendicularly to the horizontal controller key pad, and which includes a trigger for transmitting signals to the electrical device. The keys are marked with numeric indicia in sequential numeric order from 1 to 12, each switch being radially spaced 30-degrees apart. In use, the handle is grasped in one hand and the second hand is used to depress the keys arranged on the controller. After inputting the desired keys, the trigger on the handle is depressed to transmit the signal. The provision of the handle in this device, however, renders this device large and bulky. Additionally, the user is still required to use one hand to grasp the handle while the second hand is used to locate and depress the keys on the controller keypad.

Another two-handed keypad device for controlling electronic devices is disclosed in U.S. Pat. No. 5,551,693. This device comprises a controller unit having a pair of handles on each end which diverge toward the user for gripping within the user's hands. Each handle of the controller unit is provided with control sections which include a plurality of key elements arranged on the top surface as well as other controls on the lower and side surfaces of the control sections of the handles. This device, however, is directed for use with electronic video games and is not provided with numeric or letter keys, but is rather provided with directional controls only.

Accordingly, there is a need for a numeric, alphanumeric, and/or other symbolic remote control keypad unit for controlling electronic devices with simplicity and ease and which can be operated in a rapid manner which does not require excess finger strokes and which does not tire the user's eyes during operation of the device in which the finger is specialized to a specific button or switch, and which does not require the user to divert his or her eyes from the viewing screen to look for the buttons.

OBJECTS AND SUMMARY OF THE INVENTION

It is thus a general object of the present invention to provide a control keypad unit for controlling electronic devices which is simple to manufacture and easy to operate.

A more specific object of the present invention is to provide a remote control keypad unit having numeric, alphanumeric, and/or other symbolic keys for controlling television sets, video cassette recorders, video games, stereo systems and other electronic devices.

It is another object of the present invention to provide a remote control keypad unit which facilitates rapid location of specific symbols on the keypad.

It is another object of the present invention to provide a remote control keypad unit which is configured to permit placement of a user's fingers upon strategically arranged keys on the unit such that the user is capable of changing channels or stations without the fingers ever leaving the keys.

Another object of the present invention is to provide a remote control keypad having specific symbolic buttons assigned for each finger of the user's hands.

It is another object of the present invention to number the user's fingers in a manner similar to the way in which people are taught to count on their fingers during childhood.

It is a further object of the present invention to provide a remote control keypad unit which permits a user to rapidly switch to a specifically desired channel, station, or other selection without having to roll-up or down channels, stations, or other selections.

It is an additional object of the present invention to provide a remote control keypad unit which sends an electronic signal through a wire connection, or in another embodiment an infrared beam, which engages a receiver on a television set, videocassette recorder, stereo system, video game or other electronic devices.

It is still an additional object of the present invention to provide a remote control keypad unit which fits comfortably within a user's hands and which is configured to permit placement of a user's fingers upon strategically arranged keys on the unit such that the user is capable of changing channels, stations, or other selections, in the dark or without diverting his or her eyes from the television screen.

It is an additional object of the present invention to provide a remote control key pad unit which is designed to permit a user to "surf" the television channels by rapidly scanning numerous channels without diverting his or her eyes from the television screen.

These and other objects of the invention are realized by providing a remote control unit comprising a housing configured to be grasped within both hands of a user for activating and changing stations or channels on television sets, videocassette recorders, stereo systems and other electronic devices. The housing includes an upper surface and a lower surface upon which numeric and/or alphanumeric keys or buttons are arranged in a manner such that when the housing is grasped within both hands of a user, the user's fingers naturally lay upon the buttons. Additionally, channel operation buttons for the ten fingers are ergonomically arranged so that the appropriate numbered finger is arranged with its corresponding numbered switch. To facilitate this, the housing places the numbered buttons 0–9 in unique positions such that each one of the basic numbers are assigned, and thus readily located, at the fingertip of a specific finger. The finger located at each channel operation button corresponds to the numbered finger in the way we normally count the basic numbers on our fingers. For example, with the user's palms facing downward and starting at the pinky on the left hand, the fingers are numbered 1–5 on the left hand, and continuing with 6–10 (or "0") from the thumb to the pinky on the right hand. This manner of assigning numbers to a user's fingers utilizes the natural and ingrained manner in which people have been taught to count during their childhood, and thereby incurs the realization of the inherent advantages of speed, efficiency and convenience in using the fingers to easily and efficiently operate the remote control unit of the present invention.

In order to make the remote control relatively compact and to conform to the natural position of the user's hands, four channel operation buttons corresponding to four of the fingers of each hand (minus the thumbs), should be positioned on the lower surface of the housing. The two thumbs operate two channel operation buttons positioned on the upper surface of the housing. When the user's hands grasp the remote control unit and the user's fingers are placed upon the corresponding numbered buttons, the user is able to change channels or stations simply by pressing the button or buttons which their fingers are contacting. As such, the user can easily and rapidly change channels or stations in the dark and/or without diverting their eyes from the television or without having to look at the controller. Additionally, since the user need only push the button upon which his or her fingers lie, the remote control unit is easily used in the dark or can be used by those with poor eyesight.

The remote control unit of the present invention eliminates the present "hunt and peck" method of locating a channel on a remote control unit held in one hand and pressing the desired button or buttons with a finger of the second hand. By placing one's fingers upon the corresponding numbered keys arranged on the remote control unit, a television viewer or stereo listener may instantly change directly to the desired channel without having to "hunt and peck". As such, excessive finger movement is eliminated, time for changing channels is decreased, and those with stiff or arthritic fingers can use the remote control unit with ease. Additionally, the placement of a user's fingers upon correspondingly numbered keys arranged on the remote control unit greatly facilitates what has become commonly known as "surfing" the television channels. The efficiency and speed afforded by the design of the remote control unit of the present invention is also advantageous as the numbers of television channels offered increases.

The remote control unit of the present invention may also be provided with additional controls and buttons, such as an "on/off" button, volume control and channel scroll, positioned upon the remote control which may be easily reached by the slight movement of a finger of one or both hands.

The above description sets forth rather broadly the more important features of the present invention in order that the detailed description thereof that follows may be understood, and in order that the present contributions to the art may be better appreciated. Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

DETAILED DESCRIPTION OF THE DRAWINGS

In the drawings in which like reference characters denote similar elements throughout the several views:

FIG. 7 illustrates a top view of the second embodiment of the remote control illustrated in FIG. 4 grasped by and retained in both hands of a user for operation;

FIG. 8 illustrates a bottom view of the second embodiment of the remote control illustrated in FIG. 4 grasped by and retained in both hands of a user for operation;

Figure 13:
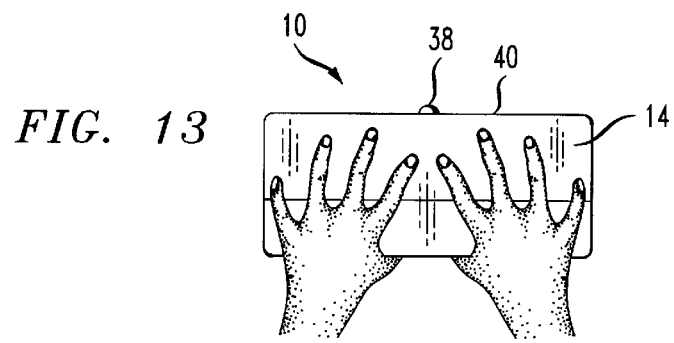
Figure 14:
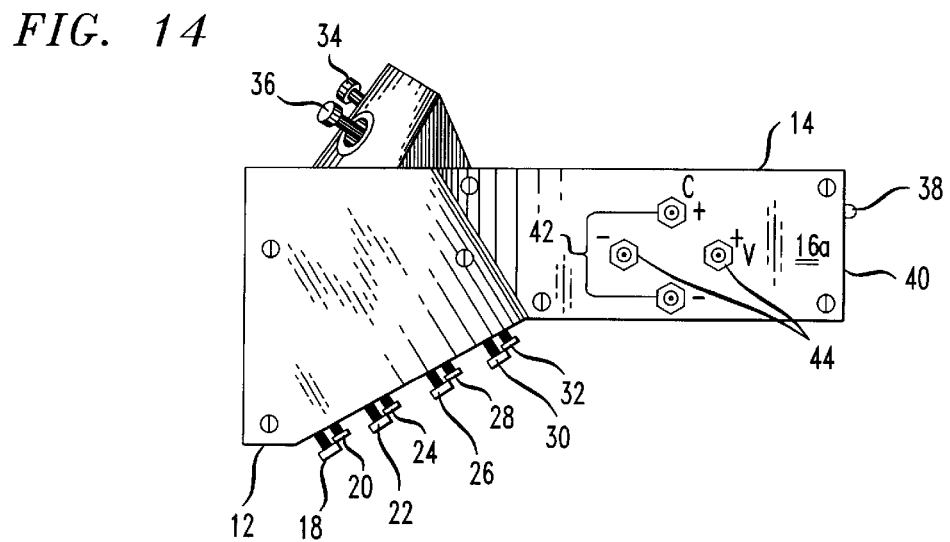

FIG. 13 illustrates an elevational view of an additional alternative embodiment of the remote control according to the present invention and grasped by and retained within both hands of a user; and FIG. 14 illustrates a side elevational view of an additional alternative embodiment of the remote according to the present invention and configured such that the volume control and channel scrolling buttons are positioned on one sidewall so that a user may change the volume or scroll channel by grasping the remote only with the right hand.

DETAILED DESCRIPTION OF THE PRESENTLY PREFERRED EMBODIMENT

Figure 1:
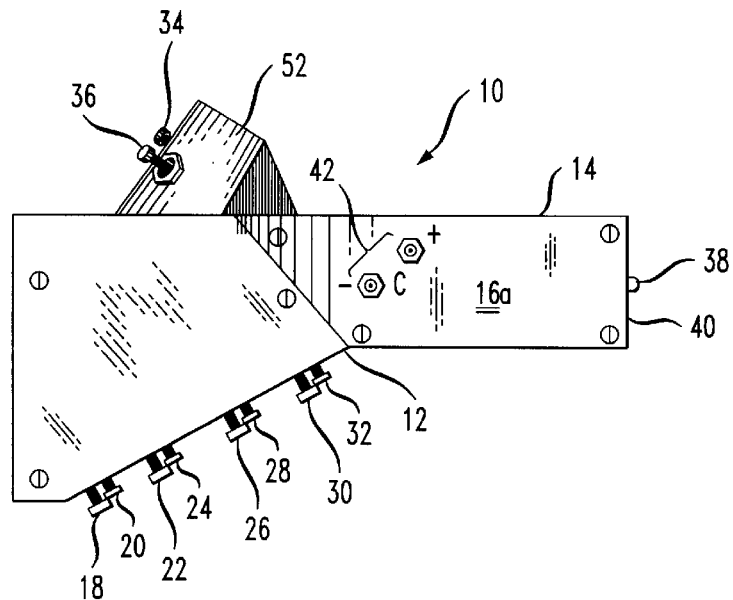
FIG. 1 illustrates a side elevational view of the remote control according to one embodiment of the present invention.
Figure 2:
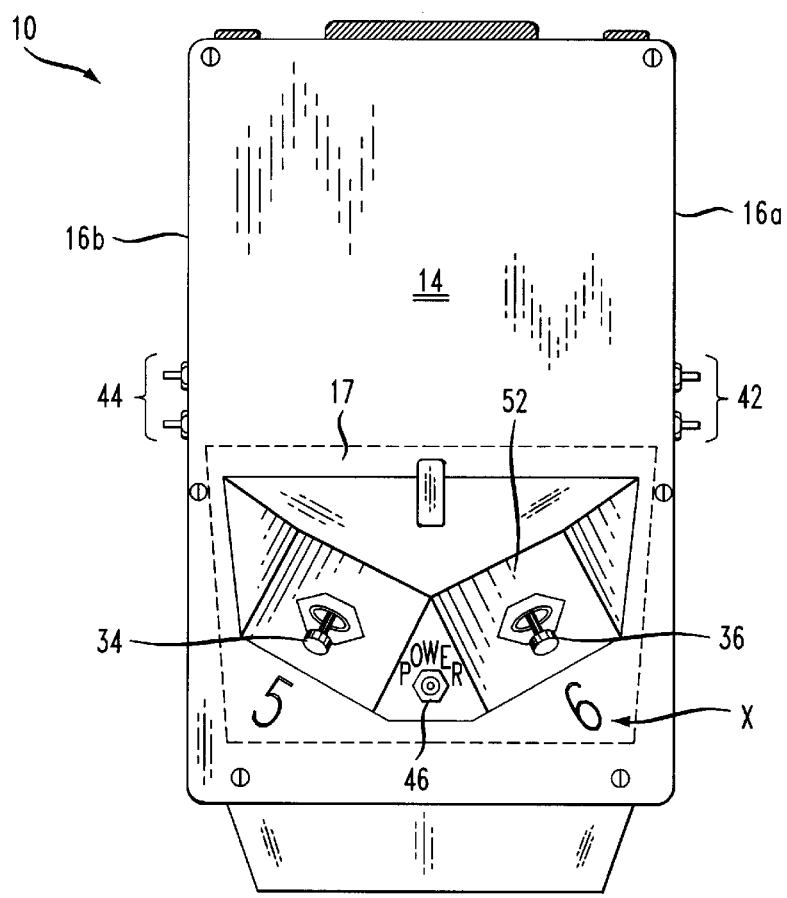
FIG. 2 illustrates a top view of the remote control illustrated in FIG. 1 according to the present invention.
Figure 5:
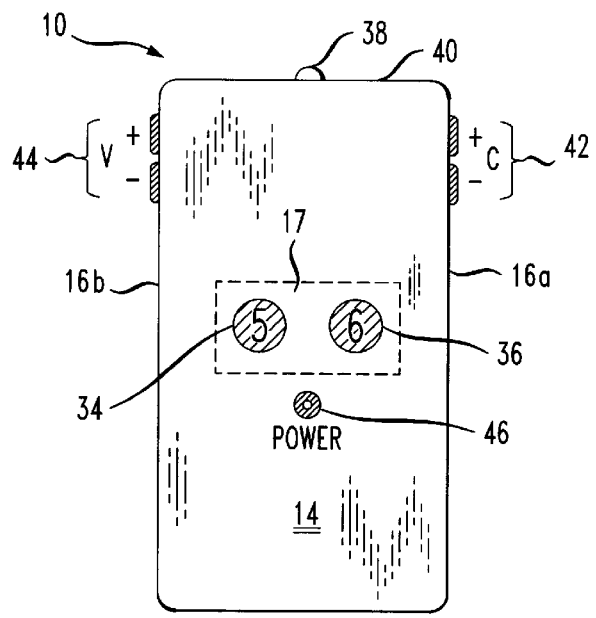
FIG. 5 illustrates a top view of the second embodiment of the remote control illustrated in FIG. 4.
Figure 6:
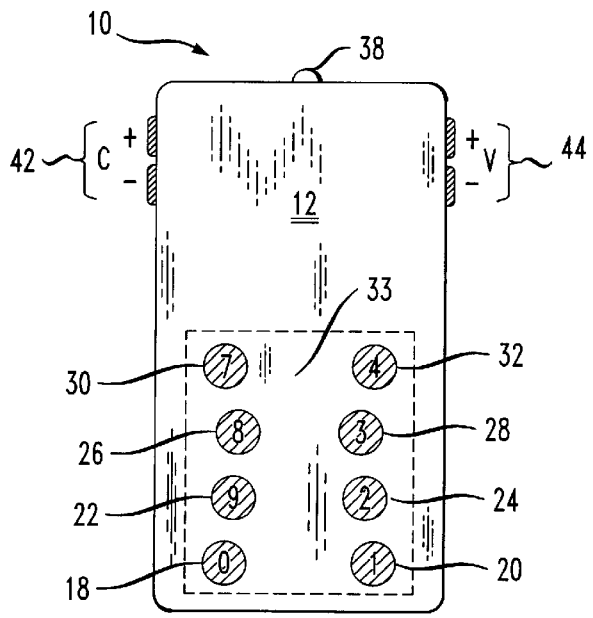
FIG. 6 illustrates a bottom view of the second embodiment of the remote control illustrated in FIG. 4.

Referring now to the drawings for a more detailed description of the present invention and more particularly to FIGS. 1–4 thereof, a wireless remote control keypad unit 10 is shown and described. Remote control 10 has a housing or body 11 defined by a lower part 12, an upper part 14 and a continuous sidewalls 16 positioned between upper part 12 and lower part 14. A keypad or plurality of channel operation buttons 18, 20, 22, 24, 26, 28, 30, and 32 are arranged on lower part 12 in an operation control area 17 as illustrated in FIGS. 2, 5 and 7. Channel operation buttons 34 and 36 are arranged on upper part 14 of remote control 10 in a second operation control area 33 as illustrated in FIG. 2. Located on or proximate each channel operation button 18, 20, 22, 24, 26, 28, 30, 32, 34, and 36 is a number, such as indicated as X in FIG. 2 and Y in FIG. 3, which alone or in a combination of two or more numbers, corresponds to a channel on a television or stereo when depressed by a user. A plurality of lights, such as LEDs and other indicators (not shown) may also be disposed on remote control 10.

Remote control 10 may also include a beam emitter 38 embedded into a front surface 40 which is generally pointed or directed towards the television, stereo or other electronic device which the remote control 10 is controlling or activating. Additional operation buttons for such things as channel scrolling 42 and volume control 44 may be positioned on sidewalls 16a, 16b as illustrated in the various embodiments in FIGS. 1–9. As illustrated in FIGS. 2, 5, and 7, upper part 14 is also provided with an "ON/OFF" or power button 46 for activating and shutting down the electronic device being controlled. Other control buttons, such as 50 illustrated in FIG. 7, may be positioned on remote control 10 for controlling any of a variety of functions such as for controlling mutation of sound, color contrast, brightness or for fine tuning sound.

Figure 3:
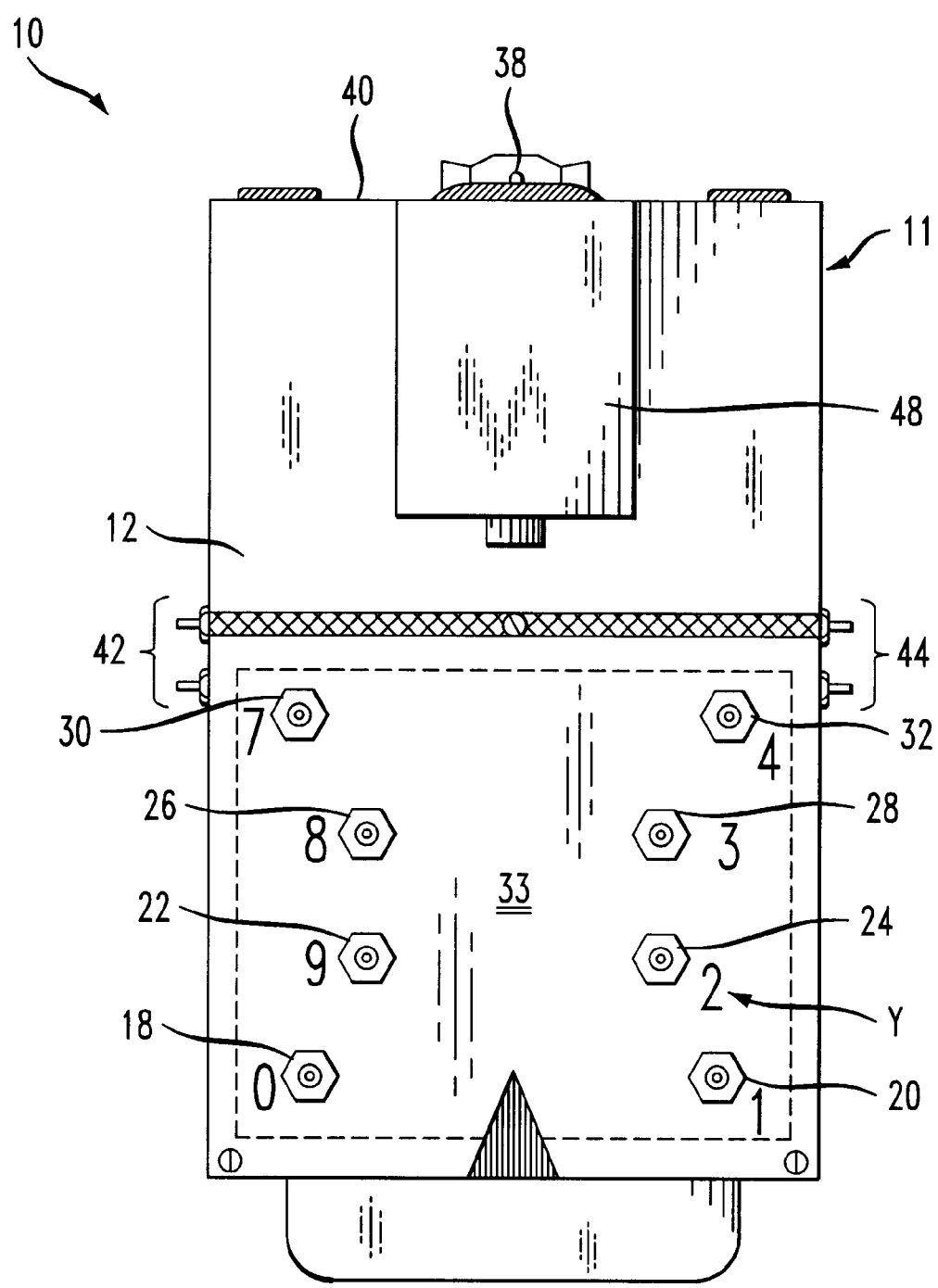
FIG. 3 illustrates a bottom view of the remote control illustrated in FIG. 1 according to the present invention.
Figure 4:
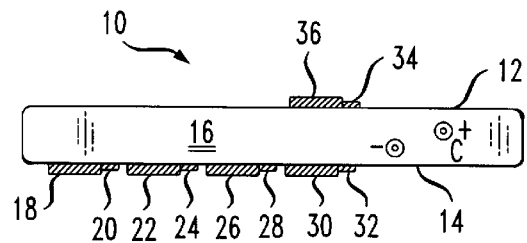
FIG. 4 illustrates a side elevational view of a second embodiment of the remote control according to the present invention.

Built within remote control 10 are selection operation means which include key switches, various circuits, mode selector switches, storage battery, etc. connected to the channel operation buttons, 18, 20, 22, 24, 26, 28, 30, 32, 34, 36, the selection scrolling operation buttons 42, and the volume buttons 44. When any one or more of the operation buttons is depressed, a code signal, which is advantageously an infrared beam, corresponding to the operation button or buttons is emitted through beam emitter 38, or in another instance a wire, and received by a coded signal receiver on the television, stereo or other electronic device being operated. FIG. 3 illustrates a removable battery casing 48 on lower part 12 of remote control 10 for replenishing a battery or batteries when their power has been depleted. The invention is not limited in the location of the battery casing 48 which may be located anywhere on remote control 10. Additionally, the invention is not limited to the shape or size of the housing 11 such that the housing may be altered in shape to reflect the shape and size of an individual user's hand. For example, remote control 10 may be provided in a few basic sizes to accommodate the different size hands of users. Additionally, stick-on pads (not shown) to enlarge sides 16a, 16b of remote control 10 may be provided to afford a longer grasp. Additionally, remote control 10 may be provided with a standard numeric pad (not shown) could also be provided on top side 14 of remote control 10 in the area ahead of raised member 52 (as shown in FIG. 2), in the event that the user does not want to grasp remote control 10 with both hands.

Figure 9:
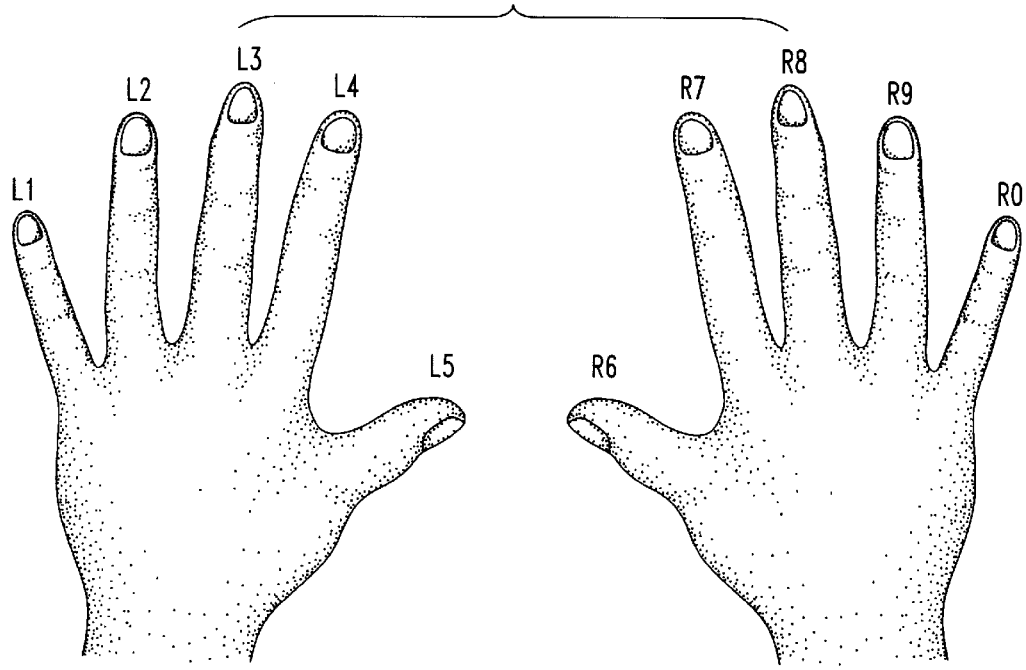
FIG. 9 illustrates a pair of hands illustrated with the palms facing downward and illustrating each finger as corresponding to a specific number for operation of the remote control according to the present invention.
Figure 10:
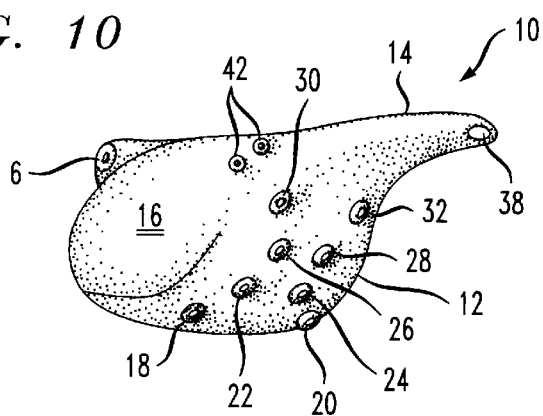
FIG. 10 illustrates a third embodiment of the remote control according to the present invention.
Figure 11:
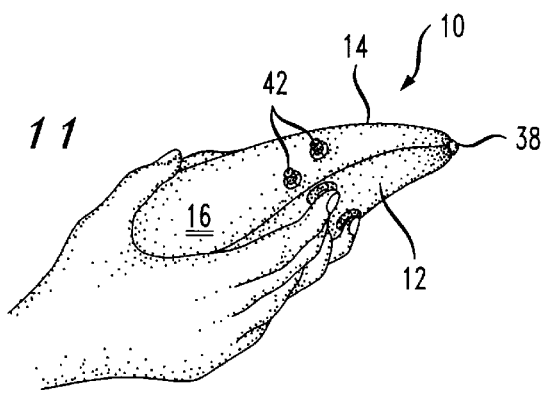
FIG. 11 illustrates a perspective view of the third embodiment of the remote control as illustrated in FIG. 10 grasped by and retained in a user's hands for operation.
Figure 12A:
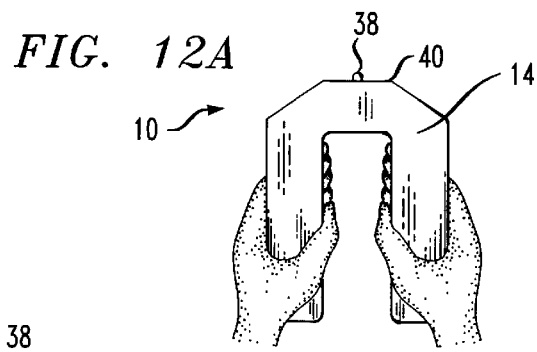
FIG. 12a illustrates an elevational view of an alternative embodiment of the remote control according to the present invention and grasped by and retained within both hands of a user.

Remote control 10 is configured to be operated by both hands of a user. Each of the embodiments of remote control 10 as illustrated in FIGS. 1, 2, 5 and 11 are ergonomically designed to be easily and comfortably grasped within both hands of the user such that remote control 10 fits comfortably within the user's hands for effortless operation. Selection operation buttons 18, 20, 22, 24, 26, 28, 30, 32, 34, and 36 are advantageously positioned such that when remote control 10 is grasped or cupped within the user's hands as illustrated in FIGS. 8, 9 and 12, the fingers of each of the user's hands rests comfortably upon one of the selection operation buttons 18, 20, 22, 24, 26, 28, 30, 32, 34, and 36 arranged on lower part 12 and upper part 14 of remote control 10. The selection operation buttons may be recessed relative to the housing or raised depending on the specific requirements of the user. Additionally, selection operation buttons 18, 22, 26 and 30 are arranged in an arc or semi circle so that when the used's right hand grasps the remote control 10, the user's finger's are ergonomically arranged on the lower part 12 of the remote control 10. Similarly, selection operation buttons 20, 24, 28 and 32 are arranged in an arc or semi circle so that when the user's left hand grasps the remote control 10, the user's finger's are ergonomically arranged on the lower part 12 of the remote control 10. As is evident, by placing the numeric switches on an arc which reflects the natural shape of the hand, each number finger is conveniently placed to activate its corresponding number switch.

In order to facilitate the rapid changing of channels, stations, or other selections such that a user may simply depress one or more channel operation buttons 18, 20, 22, 24, 26, 28, 30, 32, 34, and 36 without having to look at the channel operation buttons or remove his or her eyes from the program being watched, channel operation buttons are numbered so as to correspond to the fingers of each of the user's hands. For example, in FIGS. 3, 4, 6, 7, 8 and 9 the channel numbers assigned to each channel operation button correspond to the numbers assigned to the fingers of the user's hands numbered with the palms facing downward as shown in FIG. 9. As indicated in FIG. 9, the fingers of the user's left hand are numbered from 1 to 5 from the pinky, ring finger, middle finger, index finger to the thumb. The numbering of the user's fingers continues consecutively from 6 to 0 (the "0" connotes the number "10") starting from the user's thumb on the right hand, the index finger, the middle finger, the ring finger and to the user's pinky or small finger. Using this numbering of the user's fingers, when remote control 10 as illustrated in FIGS. 3, 4, 6, 7, 8 and 11 is grasped in the user's hands as shown in FIGS. 7 and 8, each finger as numbered in FIG. 9 lies on its corresponding selection operation button. For example, the pinky finger of the left hand numbered "L1" as indicated in FIG. 9, lies against selection operation button 20 which controls numeric digit 1, as seen in FIG. 8. Likewise, the pinky finger of the user's right hand which is assigned the number "R0" in FIG. 9 lies against channel selection operation button 18 which controls numeric digit 0, as seen in FIG. 8 when remote control 10 is grasped in the user's hands. As illustrated in FIG. 7, the user's left and right thumb fingers, which are assigned numbers L5 and R6 respectively in FIG. 9, are positioned against operation buttons 34 and 36 respectively which control numeric digit 5 and 6 respectively. As illustrated in FIGS. 1 and 2, channel control buttons 34 and 36 may be raised from upper part 14 of remote control 10 and disposed upon raised member 52 to allow comfortable placement of the user's thumbs against channel control buttons 34 and 36. This arrangement of the user's fingers to control the channel number the identically numbered channel via the selection operation buttons on remote control 10 permits rapid changing of channels or stations in the dark and without requiring the user to look at the numbered selection operation buttons, thus eliminating the familiar "hunt and peck" method of holding the remote control in one hand, viewing and searching for the desired numbered channel button on the keypad and depressing the desired channel button with a finger of the second hand. For example, if the user desires to rapidly turn to channel "74", all that the user need to press is the user's right index finger "R7" to activate selection operation button 30 and the user's left index finger "L4" to activate selection operation button 32. If the user desires to switch to channel "14", the user then presses selection operation buttons 20 and 32 with the user's fingers L1 and L4.

When remote control 10 is grasped in the user's hands as illustrated in FIGS. 7 and 8, channel scrolling buttons 42 and volume control buttons 44 on sidewalls 16a, 16b are easily controlled by the user's index fingers, numbered L4 and R7 in FIG. 9. When remote control 10 is grasped in the user's hands for normal selection operation, the user's index fingers, numbered L4 and R7 in FIG. 9, lie on selection operation buttons 32 and 30 respectively to control channels 4 and 7 respectively. When the user desires to scroll up or down channels or to increase or decrease the volume, the user simply removes the one or both of the index fingers from selection operation buttons 30 and/or 32 and moves to the channel scrolling buttons 42 and/or volume control buttons 44 on sidewalls 16a, 16b. After depressing channel scrolling buttons 42 and/or raising or lowering the volume via volume control buttons 42, the user returns his or her index fingers, numbered 4 and 7 in FIG. 9, back to their natural position on selection operation buttons 32 and 30 respectively on lower part 12 of remote control 10.

By assigning the channel numbers to correspond with the user's numbered fingers, it becomes ingrained in the user's brain that each finger controls a particular selection operation button which corresponds to the number of the finger. This takes advantage of natural way in which people have been taught to count during childhood and inherently facilitates the rapid location of a specific channel number by the simple depression of a selection operation button corresponding to a particular numbered finger. It is understood that although the above discussed arrangement of the selection operation buttons and the numbering of the fingers is the preferred embodiment of the present invention, the invention is not limited in this respect and the assignment of the channel numbers to each of the selection operation buttons is not limited to the arrangement as illustrated in the figures, such that different selection operation buttons may be numerically arranged differently with the numbering of the user's fingers than numbered accordingly so as to correspond with the channel numbers assigned to the selection operation buttons. Furthermore, the configuration of remote control 10 is not limited to the embodiments illustrated in FIGS. 1–8, and other configurations of remote control 10 exist such as indicated in FIGS. 10–13, which are easily grasped and retained within both hands of the user for effortless operation.

Figure 12B:
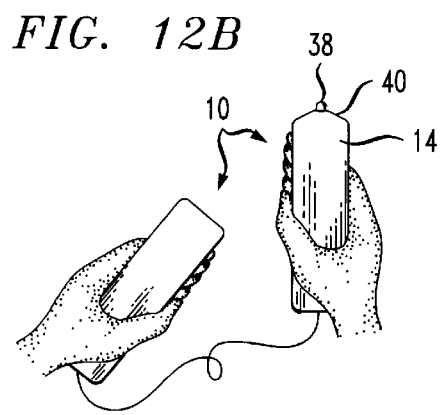
FIG. 12b illustrates an elevational view of an alternative embodiment of the remote control according to the present invention in which the remote control is comprised of two separate units fitting into each hand.

In accordance with the differing designs and configurations of remote control 10 as illustrated in the figures, the arrangement of the channel control buttons may likewise be arranged in a variety of configurations for comfort and to facilitate positioning of the fingers on the channel control buttons. For instance, as a result of the inclined configuration of lower part 12 in the embodiments illustrated in FIGS. 1, 3, 10 and 11, selection operation buttons, 18, 20, 22, 24, 26, 28, 30 and 32 are positioned in a curved configuration to facilitate finger placement. In the flat embodiment of remote control 10 illustrated in FIGS. 4–6, selection operation buttons, 18, 20, 22, 24, 26, 28, 30 and 32 on lower part 12 are arranged in a substantially straight line. In the embodiments illustrated in FIG. 12a and 12b, the selection operation buttons (not shown) are positioned on an interior surface of remote control 10 so as to correspond to the positioning of the user's fingers when the user grasps the remote control. FIG. 12b illustrates an alternative to the embodiment shown in FIG. 12a. The remote control shown in FIG. 12b is comprised of two separate handheld units 10. In turn, the user's hands would not be constrained to one position, as shown by the embodiment in FIG. 12a. In FIG. 13, remote control 10 is grasped with both thumbs of the user's hands positioned on lower part 12 and the remaining fingers of both hands positioned on upper part 14. The selection operation buttons (not shown) of the embodiment illustrated in FIG. 13 are accordingly positioned to correspond to the positioning of the user's fingers when remote control is grasped and retained in the user's hands.

Remote control 10 may also be configured to permit the user to change the volume or scroll up or down the channels by grasping remote control 10 with only one hand, which would be convenient if the user wanted to activate these functions only. Using the right hand as an example, FIG. 14 illustrates remote control 10 having channel scrolling buttons 42 and volume control buttons 44 positioned together on sidewall 16a. In this configuration, a user who does not wish to change the channel by grasping remote control with both hands, but desires only to scroll the channels upward or downward, or who desires to change the volume, etc. may simply grasp remote control in the right hand and depress channel scrolling buttons 42 and/or volume control buttons 44 with the right index finger, R7, as numbered in FIG. 9. It is understood that remote control 10 may be so designed for left-handed operation of channel scrolling buttons 42 and/or volume control buttons 44 by positioning these buttons on sidewall 16b.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

It is to be understood that the drawings are not necessarily drawn to scale, but that they are merely conceptual in nature.

What is claimed is:

1. A remote control keypad unit for operating an electronic device having a receiver means, said remote control device configured to be grasped for operation by both hands of a user, comprising:

a body having a lower part, an upper part and a sidewall extending between said lower and upper parts, said sidewall defining a first side and a second side;

an operation area positioned on said body, said operation area equipped with a plurality of operation buttons, said operation buttons arranged on said body such that when said remote control is grasped in both of said user's hands, each of said user's fingers are positioned upon one of said plurality of operation buttons so as to facilitate control of the electronic device such that selections on the electronic device may be changed by depressing the desired button with the finger which rests upon the operation button which corresponds to the desired selection;

operation means capable of generating a code signal which corresponds to one or more of said operation buttons when one or more of said operation buttons are depressed; and electrical connection means for transmitting said code signal to said electrical receiver means of the electronic device to change a selection.

2. The remote control keypad unit as recited in claim 1, wherein eight operation buttons are positioned on said lower part of said body and two operation buttons are positioned on said upper part of said body, said operation buttons positioned on said upper part of said body are configured for actuation by the thumbs of the user's hands, said operation buttons positioned on said lower part of said body of said remote control are arcuately arranged in two rows of four operation buttons and are configured to receive the pinky, ring, middle and index fingers of each of the hands of the user such that said remote control is naturally grasped in the user's hands for operation.

3. The remote control keypad unit as recited in claim 1, further comprising selection scrolling buttons and volume control buttons positioned on said sidewall.

4. The remote control keypad unit as recited in claim 3, wherein said selection scrolling buttons are positioned on said first side of said sidewall, said selection scrolling buttons being positioned for easy touch activation by one of the fingers of the user's hands.

5. The remote control keypad unit as recited in claim 3, wherein both said selection scrolling buttons and said volume control buttons are positioned on one of said first or said second side of said sidewall.

6. The remote control keypad unit as recited in claim 2, wherein said operation buttons are provided with symbolic selection indicators positioned thereon.

7. The remote control keypad unit as recited in claim 2, wherein said operation area further comprises symbolic selection indicators positioned proximate said operation buttons.

8. The remote control keypad unit as recited in claim 2, wherein each of said operation buttons are assigned a symbol to correspond to selection inputs to be entered by the fingers of the user's hands.

9. The remote control keypad unit as recited in claim 2, wherein said operation buttons positioned on said top part of said body are positioned on a raised member for comfort and to facilitate actuation of said operation buttons by the thumbs of said user's hands.

10. A remote control keypad unit for operating an electronic device having a receiver means, said remote control keypad unit comprising:

a first and a second body, each of said bodies configured to be grasped for operation by a corresponding hand of both hands of a user, wherein a sidewall extends between a lower part and an upper part of each of said bodies, said sidewall defining a first side and a second side;

an operation area positioned on said bodies, said operation area equipped with a plurality of operation buttons, said operation buttons arranged on said bodies such that when said remote control is grasped by said both hands of said user, at least one finger from each of said user's hands are positioned so as to rest on at least one corresponding operation button of said plurality of operation buttons, wherein said operation buttons are coupled to operation means capable of generating a plurality of code signals, each of said code signals corresponding to at least one of said operation buttons being depressed, and wherein said code signals are transmitted via a direct electrical connection means to said direct electrical receiver means of the electronic device.

11. The remote control keypad unit of claim 10, wherein said operation buttons are configured to facilitate control of said electronic device by changing a selection on said electronic device via said code signals, when at least one said buttons are depressed.

12. The remote control keypad unit of claim 10, wherein said operation area is positioned on at least one of said upper part, said lower part, said first side, and said second side.

13. The remote control keypad unit of claim 10, wherein said first and second bodies are configured as two separate units so that said user can grasp each of said bodies with said corresponding hand without constraining said hands to one position.

* * * * *